United States Patent

Kaiser

[15] 3,635,819

[45] Jan. 18, 1972

[54] PROCESS FOR CLEANING UP OIL SPILLS

[72] Inventor: Robert Kaiser, Cambridge, Mass.

[73] Assignee: Avco Corporation, Cincinnati, Ohio

[22] Filed: June 15, 1970

[21] Appl. No.: 46,558

[52] U.S. Cl. .......................... 210/40, 210/65, 210/DIG. 21, 252/62.51
[51] Int. Cl. ........................................................ E02b 15/04
[58] Field of Search ................ 210/46, 65, 222, DIG. 21, 24, 210/36; 252/62.51, 62.52, 62.56, 309, 326, 358, 363.5

[56] References Cited

UNITED STATES PATENTS

| | | | |
|---|---|---|---|
| 2,367,384 | 1/1945 | Tymstra et al. | 210/40 X |
| 3,214,378 | 10/1965 | Hanneman | 252/62.52 |
| 3,281,403 | 10/1966 | Manuel et al. | 252/62.51 |
| 3,344,062 | 9/1967 | Kosar | 210/222 X |
| 3,531,413 | 9/1970 | Rosensweig | 252/309 X |

FOREIGN PATENTS OR APPLICATIONS

| | | | |
|---|---|---|---|
| 705,050 | 3/1954 | Great Britain | 252/62.52 |
| 756,563 | 9/1956 | Great Britain | 252/62.52 |

*Primary Examiner*—Reuben Friedman
*Assistant Examiner*—Thomas G. Wyse
*Attorney*—Fidelman, Wolffe & Leitner

[57] ABSTRACT

The present invention relates to a system for controlling oil spills floating on open bodies of water. The process involves dispersing a hydrocarbon base ferrofluid containing an oil soluble water insoluble surfactant and a stable colloid of magnetic solids e.g. magnetite into the oil slick, then using a magnetic field to attract and pick up the oil spill, which is now magnetically responsive.

10 Claims, No Drawings

PROCESS FOR CLEANING UP OIL SPILLS

The present invention relates to removal of the oil slicks or spills from open bodies of water.

An ever increasing use of petroleum products worldwide has brought with it a proportionate increase in the number of accidental or deliberate hydrocarbon oil spills in open bodies of water, rivers, harbors, lakes, oceans. Major spills such as those caused by marine accidents receive widespread notoriety and have catastrophic effects on sea life and beach fronts. Unfortunately, major spills are distinguished only by their magnitude. The more common minor spills which are hardly less deleterious receive little attention and clean up efforts. A typical oil spill is the discharge (accidental or deliberate) of from 500 gallons to 100,000 gallons of a petroleum product. The materials most frequently spilled are No. 6 fuel oil (Bunker C.) crude oil and heavy diesel oil. Such spills float for extended periods of time and their residue often wash up on the beaches. Spills of lighter petroleum products such as gasoline or kerosene ultimately evaporate. However, the heavier hydrocarbons like crude oil oxidize or otherwise react with air and water to become more like tar. A fully developed petroleum product spill is a thin slick or discontinuous film about 1.5 mm. or less in thickness, is a very viscous liquid tar like material having a specific gravity of from about 0.8 to 1.0 and drifts freely on the surface of the water, being carried about by wind, wave and current.

At the least, oil spills are a serious pollutant. Large spills can be positively disastrous to birds and sea life. Even small spills can foul beaches. The desirability of mopping up oil spills has long been recognized. Unfortunately doing so is very difficult, often impossible, even where expense is no object.

The difficulty is real. The oil is spread over a wide area; is a thin film, often less than a quarter of an inch thick, and is water wet, may even be in an emulsified form. Removing oil spills from open bodies of water is difficult and very expensive.

The present invention involves an approach to oil spills not heretofore considered by the art. Specifically, the present invention contemplates dispersing a magnetic material into the oil spill. This magnetic material forms a stable suspension in the oil spill and does not separate in the presence of gravity or magnetic field. The oil is then removed, collected or mopped up by application of a magnetic force to the oil.

The above easily stated description of practice according to the present invention presupposes that adequately dispersing a magnetic material into the tarlike material of the usual oil spill is both possible and practical and that magnetic fields adequate to the purpose can be applied to the oil slick.

A related assumption is that loading the oil film with magnetic particles (assuming such can be done) will not so weigh the slick as to cause it to sink. Actually, sinking an oil spill has been suggested to the art, but within the context of this invention sinking is not considered desirable. The object of this invention is to provide a process for removing an oil spill altogether, not to hide it at the bottom of the body of water.

The present invention is largely based upon the existence of a recently discovered class of materials known as ferrofluids. Briefly stated a ferrofluid is a stable suspension of finely divided magnetic particles in a carrier fluid. The suspension or colloidal dispersion does not settle out under the influence of gravity or even of a magnetic field. Within the context of the present invention the finely divided magnetizable particles include the materials usually recognized as being magnetic such as magnetite, gamma iron oxide, metallic iron, etc., and also any material having a saturation magnetization at room temperature in excess of 1,000 Gauss. This class of materials includes also cobalt, nickel, gadolinium, samarium-cobalt and similar alloys, chromium dioxide, ferrites such as manganese-zinc ferrite, manganese ferrite, nickel ferrite, and many other materials. The preferred materials for practice of the present invention are magnetite and gamma iron oxide.

The materials suspended in ferrofluids are very small with a particle size, normally less than about 300 A., and will, for example, average about 100 A. To repeat, ferrofluids are now well known in the art and are described in greater detail in numerous patents and publications. Practice of this invention requires a carefully formulated special class of ferrofluids.

The particular ferrofluids employed for practice of the present invention require certain physical attributes. Specifically they must be miscible with a wide range of petroleum oils, and in particular with the tarlike heavy hydrocarbons of the typical oil spill. Desirable, but not necessarily, they should be less dense than fresh water, or sea water. The ferrofluids must have a low spreading characteristic (on water) and high magnetic susceptibility. Also desirable for safety reasons are such things as an absence of toxicity and a high flash point. Many of the desirable and necessary ferrofluid characteristics outlined above involve properties of the carrier liquid and in consequence only a relatively small group of materials are suitable for use as the carrier liquid.

Specifically, the materials useful as carrier liquids are paraffins and napthenic, i.e., aliphatic and cyclic saturated hydrocarbons, having a boiling point in excess of about 100° C., but not so high in molecular weight as to have a viscosity in excess of 5 centistokes at 30° C. The carrier liquids may also be described in more strictly chemical terminology as being paraffin hydrocarbons (or aliphatic) from about $C_{9-21}$ and the saturated napthenic hydrocarbons from about $C_7-C_{18}$. All isomeric forms are suitable, i.e., straight chain, branched, monocyclic bicyclic, etc. Such materials are normally available as mixed hydrocarbons, e.g., white oil, rather than as pure compounds. Actually hydrocarbon mixtures are preferred over a pure hydrocarbon compound. The mixtures have lower pour points and a better controlled evaporation rate. Mixtures are a lot cheaper than the pure compounds.

Surprisingly, even closely related materials are not suitable and fall outside the scope of the carrier useable for practice of the present invention. For example the $C_{9-21}$ olefins are less stable, more water soluble, and in addition, they spread on the water more readily than do the paraffins or naphthenes. Aromatic hydrocarbons are particularly undesirable. They are toxic to sea life and pose danger to those handling the ferrofluid. The density of aromatic liquids is too high for satisfactory use. In addition, the aromatics also have the disadvantage of spreading too readily. Chlorinate hydrocarbons are too dense, too toxic and can spread too readily. Still other solvent systems have been investigated for possible use as the carrier liquid e.g., ethers, esters, amines, heterocyclics, but for one reason or another have proven unsuitable. Accordingly, practice of the present invention is explicitly limited to ferrofluids wherein the carrier is selected from the above described group of paraffinic hydrocarbons, naphthenic hydrocarbons, and mixtures thereof.

However, proper selection of the carrier liquid will not in itself provide a ferrofluid with all the requisite physical attributes for purpose of this invention. Some attributes are provided by proper selection of the colloid stabilizing ingredient, i.e., the surfactant and its relative proportion in the ferrofluid.

The specific problems involved in controlling an oil spill impose certain physical requirements on the surfactant which is present in the ferrofluid to stabilize the suspension of finely divided magnetizable particles in the carrier liquid, just as they have dictated certain requirements for the carrier liquid itself. Thus, the surfactant must be hydrocarbon oil soluble and water insoluble. A solubility of less than 0.5 percent by weight in water constitutes a reasonable numeric criterion for what is water insolubility. In addition, the surfactant must not result in undue spreading of the ferrofluid on water or of the oil-ferrofluid mixture on water. Desirably, the surfactant itself should be nontoxic.

The criteria of oil solubility and water insolubility are well known physical properties which need no explanation or discussion. However, the requirement of limited spreading ability so significant within the context of the present invention needs explanation, perhaps a definitive description.

When a given volume of an oil is placed on the surface of water, which is a denser, immiscible liquid so that it is initially present in a layer of appreciable thickness, several possibilities exist as to what may happen next. These phenomena are best treated in terms of the "spreading coefficient," a concept originally proposed by Harkins, W. D., J. Chem. Phys., 9, 552 (1941). By definition, $S\,o/w = \gamma w - \gamma o - \gamma ow$
where $S\,o/w$ = spreading coefficient of the oil on water, dynes/cm.
$\gamma w$ = surface tension of water against air, dynes/cm.
$\gamma o$ = surface tension of the oil against air, dynes/cm.
$\gamma ow$ = interfacial tension of the oil against water, dynes/cm.

A positive value of $S\,o/w$ indicated that spreading of the oil on water is accompanied by a decrease in free energy of the system, so that the oil will spread spontaneously on the water surface until it is present as a thin film of molecular dimensions. Conversely, a negative value of $S\,o/w$ indicates that the spreading of the oil on water would be accompanied by an increase in free energy. Therefore, the oil will not spread on the water but remain as a stable lens, its equilibrium configuration being dictated by the boundary tensions, the gravitational potential energy of elements of volume and the pressure differences across the curved surface. The carrier liquids employed in this invention have a zero or negative spreading coefficient against distilled water at ambient temperature.

A similar definition of the spreading coefficient ($S'\,o/w$) applies for an oil containing a surface active solute which alters the oil/air ($\gamma'o$) or oil/water ($\gamma'ow$) interfacial tension.

Here, introduction of a small amount of surface active agent in the oil will have no effect on the oil/air interfacial tension so that $\gamma'o = \gamma o$. However, even small concentrations of a surface active agent which adsorb at the oil/water interface can markedly reduce the surface tension of the oil ($\gamma'o/w < \gamma o/w$) and thus, the spreading coefficient of the solution, $S'\,o/w$, will be greater than that of the carrier liquid. When $$|\gamma o/w - \gamma'o/w| \geq |So/w|.$$

the oil solution will no longer form a stable lens, but will spread spontaneously on the aqueous substrate. Examination of the vast body of literature (see for example, Zisman, W. A., J. Chem. Phys., 729 Vol. 9 (1941) on the spreading characteristics and interfacial tension measurements of oil/water systems indicate that the initial change in spreading coefficient of a hydrocarbon oil/surfactant solution on water at very low surfactant concentrations, varies as a linear function of the surfactant concentration, $c$ (moles/liter), in the hydrocarbon oil with the composition of the hydrocarbon oil itself having little effect. This can be expressed mathematically as follows:

$$\left(\frac{dS'o/w}{dc}\right)_{c \to 0} = -A$$

Since there are many surface active agents which are widely different in chemical structure, but have similar values of A, and since the spreading characteristics of the ferrofluid are of primary consideration to the invention, the surfactants which can be used in context of the present invention can be defined as having a value of $$A \leq 10^5 \frac{\text{dynes/cm.}}{\text{mole/liter}}$$

A realistic screening test to determine whether a given surfactant meets the above requirement for practice of this invention would be to determine the concentration of the surfactant in a nonspreading paraffin hydrocarbon oil which results in a solution that spreads on distilled water at ambient. Since the spreading coefficient of the pure oil is known (Gillap, W. R., Weiner, N. D. and Gibaldi, M., J. Am. Oil Chemist Soc., 44, 71 (1967)), A is easily determined. A representative hydrocarbon liquid for these tests is tetradecane, ($S\,o/w = -6.4$ dynes/cm.), for decahydronaphthalence the value is $-11$ dynes/cm.

To repeat physical characteristics like oil solubility, water insolubility and spreading coefficient are the criteria for the surfactants suitable in practice of the present invention. Extensive tests have indicated no adequate chemical basis for selecting those surfactants most suitable for forming ferrofluids and then picking the particular surfactants useable in the ferrofluids required for practice of the present invention. Fortunately, the surfactant art is most extensive, the literature thereon voluminous, and the surfactant compounds legion. A tremendous number of diverse materials have surface active properties and can be identified as being surfactants, e.g., fatty acids, alcohols, amines, amides, alkyl phenols, other organic acids, polyacrylates, just to name some. One possible chemical correlation indicated by tests and theoretical studies on ferrofluids is the apparent need for at least a 12 carbon atom chain in the surfactant, but this need appears related more to colloid stabilization in all ferrofluids than to the special ferrofluid requirements of this invention. To repeat again, the only basis found for inclusion or exclusion of a particular surfactant capable of forming a ferrofluid are the physical requirements of: hydrocarbon oil solubility, water insolubility and spreading coefficient. As at least a point of preferred practice, the surfactant should exhibit irreversible adsorption on the magnetic particle surface. Conceivably irreversible adsorption may be a necessary physical characteristic for surfactants suitable in practice of this invention, but not enough data is available to pose such as a certainty.

More must now be said about the spreading coefficient. The rationale underlying a numeric limitation for the spreading coefficient resides in the character of the hydrocarbons in oil slicks. Most of the petroleum oils which occur in oil spills have a spreading coefficient somewhat in excess of 20 dynes/cm., usually in the range of 25–45 dynes per centimeter (Garrett, W. D. and Berger, W. R., Environmental Science & Technology, Vo. 4, No. 2, 124 Feb. 1970).

Natural petroleum products contain significant but variable amounts of sulfur, oxygen or nitrogen containing compounds that are surface active and tend to promote the spreading of an oil slick once it's formed. The extent of the spreading is a function of the quantity and nature of the surface active components of the oil. It should be pointed out that the properties and history of the oil slick determine its spreading characteristics much more than whether the aqueous substrate be sea water or fresh water a difference which would result in variations of spreading coefficient of less than 1–2 dynes/cm. Addition to the oil slick of a ferrofluid containing a surfactant with as high or a higher spreading coefficient than the existing slick would serve only to spread the slick further and make cleaning up the slick that much more difficult. Yet the ferrofluid must disperse in the oil. The ferrofluid can disperse in the oil either as a result of normal diffusion processes which are slow, the natural mixing action of waves or by spreading at the oil slick water interface. Therefore, some surface activity is desired.

It follows then the part of the physical criteria for the ferrofluid, one relating to the surfactant, is a substantial and real limitation on its content. The ferrofluid of the present invention contains a carefully controlled minimum proportion of surfactant. In practical terms this is a lower proportion of surfactant than usually is present in ferrofluids.

Here too, elaboration may be required. A ferrofluid is a colloidal dispersion of magnetic particles in a carrier liquid stabilized by the surfactant. The surfactant and the magnetic particles can be considered as joined, even reacted. However the system is dynamic with some of the surfactant in free solution, some firmly attached, some loosely attached and at all times partitioning between adsorption at the surface of the magnetic particles and free solution in the carrier. (The surfactant in free solution is available for surface action at the oil-water interface when the ferrofluid is in contact with water.) In formulating the usual ferrofluid the primary concern is achievement of colloid stability; and substantial excess of surfactant is included as a matter of course. Here, an almost equal concern exists about avoiding presence of excess surfactant. Only enough surfactant is present for colloid stability.

If the surfactant exhibits irreversible adsorption on the surface of the magnetic particles then the total surfactant content in the ferrofluid may approximate the bound up surfactant without need for enough surfactant to counter also dilution factors i.e., the effect of adding ferrofluid to an oil slick, and to counter the effect of an oil-water interface.

The spreading coefficient alluded to above can be employed as a test on the ferrofluid (against distilled water at ambient) to determine surfactant suitability. Here the spreading coefficient should not exceed about 20 dynes per centimeter.

The spreading coefficient of a candidate ferrofluid surfactant may be obtained by direct measurement of the surface tension and the interfacial tension against water of the ferrofluid by standard analytical methods (which, however, are time consuming and require great skill). A simple screening test which accomplishes the same goals is to dilute a ferrofluid with a given volume of a nonspreading hydrocarbon solvent and determining whether a drop of the resulting mixture spreads on distilled water. If it is assumed that $S\,o/w - S'o/w$ is proportional to the free surfactant concentrations, the ratio of ferrofluid to diluent solvent is determined by the limit of 20 dynes/cm. chosen for the ferrofluid and the spreading coefficient of the pure diluent hydrocarbon solvent. With tetradecane as the test liquid, a drop of a mixture of 1 volume of the candidate ferrofluid diluted with 3 volumes of pure tetradecane should not spread on distilled water at ambient temperature in order for this ferrofluid to meet the requirements of the present invention.

As a proviso, it may be noted that the ferrofluid usually contains far more than a negligible concentration of surfactant in the carrier liquid, but that substantially all of the surfactant is bound to the magnetic particles. In effect the spreading coefficient test shows that virtually no free surfactant is present in the ferrofluid, (typically less than $10^{-2}$ moles/liter).

Although only the above-identified physical characteristic for the surfactant in ferrofluids are crucial, preferred surfactants for practice of this invention can be identified in chemical terms. They are the carboxylic acids $C_{12}$ and higher, saturated or unsaturated, natural or synthetic in origin including for example, oleic acid. The carboxylic acids may even by very high molecular weight carboxylic acids (such as for example the polyisobutene acids disclosed in British Pat. No. 1,075,121). The preferred suitability of the $C_{12+}$Carboxylic acids as a class with no upper limit further illustrates the extent to which the surfactant cannot be defined in chemical terminology. The true upper limit for the number of carbon atoms in the carboxylic acid chain is again a physical parameter, i.e., the oil insolubility of very high level molecular weight carboxylic acids. Also preferred are the $C_{12}$ and higher fatty alcohols and alcohol esters. Further identification of preferred surfactants does not appear warranted in light of the tremendous extent of the literature on oil soluble, water insoluble surfactants and on the virtually infinite number of surfactants which can be made.

Some discussion is required about the proportion of magnetic particles in the ferrofluid. Obviously as much as possible is best, but the upper limit for a realistic ferrofluid is set by the specific gravity of the ferrofluid. Ferrofluids formed in the paraffins and naphthenic hydrocarbons described above can be formulated with specific gravity far in excess of that of sea water, e.g., specific gravity 1.5, particle content about 15 percent by volume. Certainly, in terms of shipping, the highest possible concentration of magnetic particles might be advantageous, but as a practical matter a density limit of sea water and of fresh water exists for marine and fresh water application respectively. Numeric concentration ranges in terms of percent by volume of magnetic particles per part of carrier will depend on the individual carrier liquid and therefore even the preferred range is imprecise, almost arbitrary. Generally the concentration of magnetic particles in the carrier should be from about 3 percent to 10 percent by volume. The actual upper limit for specific gravity i.e., a density just below 1 g./cm.³ or 1.03 g./cm.³, will depend upon the density of the carrier, the density of the surfactant and the density of the magnetic material. Although to repeat, ferrofluids containing as much as 20 percent by volume of magnetizable material have been made in these hydrocarbon carriers and 40 percent content is believed theoretically possible. In passing it is noted that high particle content ferrofluids tend to be relatively viscous. However viscosity considerations have not been found to be material with the relatively low particle content ferrofluids consistent with a specific gravity of about 1.

A much more realistic specific gravity limit exists for the ultimate concentration of magnetic particles in the oil slick itself. In a word, the final mixture of ferrofluid and oil in the slick cannot exceed the specific gravity of the body of water on which the oil slick floats. Otherwise it would sink, a result considered very undesirable within the context of the present invention. This possibility is avoided by using ferrofluids which themselves float. A typical oil slick will usually have a specific gravity ranging from 0.80 (no. 2 fuel oil) to as high as 1.0. Usually the oil slick is a tar like material with a specific gravity of 0.90 to 0.95. Limiting the maximum magnetic particle content of the ferrofluid to whatever results in a ferrofluid just under the specific gravity of the water will never cause the oil slick to sink.

For logistic and economic reasons it is manifestly desirable to add as little ferrofluid as reasonably possible to the particular oil slick. The minimum quantity of ferrofluid necessary to achieve significant results can be just enough to provide about 0.01 percent by volume of magnetic particles in the final mixture of oil slick and ferrofluid. Such as small concentration does require powerful magnetic forces. As a practical matter, if the expense of adding ferrofluid to an oil slick is justified by the circumstance of the oil spill then enough should be added for facile control of the oil slick through magnetic forces. Preferred is a particle content above about 0.5 percent by volume. The general range of magnetic particles in the oil—ferrofluid mixture contemplated for preferred practice of the present invention is 0.5 to 3.0 percent by volume of magnetic particles in the final mixture. In some instances a concentration of up to about 4.0 percent may be employed.

For a ferrofluid of magnetization $M$, the application of a magnetic field of magnitude $H$ results in a magnetic pressure expressed as follows:

$$P_m = \frac{1}{4\pi} \int_0^H M dH \text{ dynes/cm}^2.$$

The magnetization of $M$ of the ferrofluid in turn can be expressed as follows:

$$M = \epsilon_M M_d \mathcal{L}(x)$$

$$\mathcal{L}(x) = \coth x - \frac{1}{x}$$

$$X = \frac{\bar{V}_M M_1 H}{4\pi kT}$$

where:
$M_\lambda$ = Domain magnetization of the magnetic particles gauss
$\epsilon M$ = Volume fraction of magnetic colloid in suspension
$\bar{V}_M$ = Average volume of magnetic particles
$k$ = Boltzmann's constant
$T$ = Absolute temperature, °Kelvin
For low applied fields ($x \ll 1$)

$$M = \frac{\epsilon_M M d}{3X} = \frac{\bar{V} M \epsilon_M M^2 d}{12\pi kT} H$$

and for high fields ($x > 3$)
$M = \epsilon_m M d = Ms$

Under these conditions magnetization is independent of field and is equal to the saturation magnetization of the ferrofluid $Ms$. For a magnetite suspension ($Md=5,600$ gauss) of average particle volume $\bar{V}_m = 5 \times 10^{-19}$ cm.$^3$ (i.e., 100 A. particles), the "high field" approximation applies for all fields in excess than 500 oersteds. As an example, a magnetic pressure of 4,500 dynes/cm.$^2$ will result from the application of a 1,000 oe field to a 1 percent by volume suspension of magnetite $Ms=56$ gauss).

This force is significantly higher than the gravity head and surface spreading forces normally encountered in an oil slick. Assuming a conservative difference of 0.1 g./cm.$^3$ in density between the oil and water the equivalent gravity head is 100 dynes/cm.$^2$ per cm. of slick thickness. Since most slicks are significantly less than 5 cm., this sets 500 dynes/cm.$^2$ as an upper bound for the gravity head term. The spreading pressure due to surface tension forces can be taken to be equal to the spreading coefficient divided by the thickness of the slick. For a typical oil slick with a spreading coefficient of 30 dynes/cm. and a thickness of 1 mm., the equivalent surface pressure is 300 dynes/cm.$^2$.

The minimum realistic magnetic pressure that has to be exerted on a slick in order to control it is, therefore, 500 dynes/cm.$^2$, even though much smaller pressures would be effective on thin nonwetting slicks. Since magnetic fields significantly higher than 1,000 oe can be easily generated, for example, 100,000 oe electromagnets are now not uncommon, a very small concentration of magnetic particles is required in the oil slick to achieve a pressure of 500 dynes/cm.$^2$. Assuming $10^4$ oe to be an upper realistic value of the magnets that could be used under contemplated field conditions, the concentration can be as little as about 0.01 percent by volume.

In a sense it is surprising that sweeping statements and percentage parameters can be provided for magnetic particle content in light of the diverse character of oils spilled, including for example pure No. 2 fuel oil which is quite fluid and reduced crude oil which is very viscous and regardless whether the spill is fresh or weathered. Certain compensating factors seem to exist. If the oil spill is of low viscosity then the ferrofluid will diffuse through rapidly and a substantially uniform particle content is achieved quickly. If the material is polymerized, oxidized and emulsified into the tarlike material of a weathered spill then the ferrofluid will diffuse very slowly but, by the same token magnetic forces applied to a region concentrated in particles will attract that portion of the slick and in turn substantial quantities of the nonmagnetic tarlike material deficient in particles attached to the magnetized portion will be dragged along due to the cohesion of the oil.

In this connection it is noteworthy that mixing the low viscosity ferrofluid with the oil spill presents no great difficulty. The carrier hydrocarbons are miscible with the oil spill hydrocarbons. After all, an oil spill floating on a body of water is relatively thin, never exceeding more than a couple of inches in depth even for a fresh spill, normally less than a centimeter, and ultimately in a weathered spill as little as a millimeter in depth. Therefore the free flowing ferrofluid sprayed or otherwise applied on the surface of an oil spill, will readily penetrate into the oil slick and in a quite short period of time, certainly within a couple of hours will disperse itself sufficiently to transform the oil slick as a whole into a magnetizable mass, i.e., into a more dilute ferrofluid. The agitation which occurs through wind and wave action will actually enhance dispersion of the ferrofluid throughout the oil slick.

All oil slicks are subjected to natural forces which tend to spread the slick, i.e., wind and wave action, currents, certain (gravitational) forces due to differences of density between the oil and the water as well as interfacial surface tension at the interface of the oil and water. Prior art attempts to control oil slicks are essentially passive efforts to counteract the natural forces involving for example, booms to contain the slick and absorption of the oil on straw or in particulate material. Essentially all rely upon immediate physical contact between the collection device and the oil slick. A collection device can collect oil only to the extent that physical contact can be made. Even then some of the oil often slips back into the slick. Few, if any, of the prior art techniques are intrinsically inconsistent with addition of a ferrofluid to the oil slick (converting the oil slick as a whole into a ferrofluid). Now it is possible to utilize magnetic forces either alone or in addition to any other control techniques.

However, in contrast to the passive nature of prior art, magnetic forces can be employed as an active counter force against dynes/cm.$^3$. natural forces affecting the oil slick, in addition to the forces of gravity and surface effects discussed above. The actual magnitude of the natural forces to be counteracted may be estimated by calculating the contribution of a particular factor to the velocity of the slick, and calculating the equivalent stagnation pressure, $\frac{1}{2}pV2$ where $p =$ density of the oil $= 1.0$ g./cm.$^3$.

There are a number of contributions to the velocity term. These include:

a. Current — For example a 0.5 knot current will result in a stagnation pressure of 300 dynes/cm.$^3$.

b. Wind—It has been shown that a wind induced slick velocity is about 3 percent of the wind velocity. (Midy, G. M. and Plate E. J., Journal of Fluid Mechanics 26 651 (1966). Thus a 20 m.p.h. wind will result in a slick velocity of a 0.6 m.p.h. or 0.5 knot. This also results in a stagnation pressure of 300 dynes/cm.

c. Wave motion, as exemplified by Wave Induced Drift which was shown by Hoult "Containment and Collection Devices for Oil Slicks," pp. 65–80, in OIL ON THE SEA, Hoult D. P. Editor, Plenum Press New York 1969 to be 0.6 knot for 4 feet waves. This results in a equivalent pressure of 430 dynes/cm.$^2$.

In the example given above a magnetic pressure of 4,500 dynes/cm.$^2$ is obtained with a ferrofluid containing 1 percent $Fe_3O$ by volume ($Ms = 56$ Gauss) upon application of a 1,000 oe magnetic field in this instance more than equal to the cumulative natural forces set out above. Since wind induced velocity, current and even wave induced drift can be matched by the velocity of the collecting vessel, only the gravitational force and interfacial tension must be opposed. As little as 0.01 percent by volume of magnetic particles in an oil slick and a strong magnetic field, e.g., 1,000 oe, can counter the force of gravity and of interfacial tension. This means an oil slick-ferrofluid mixture having more than 0.01 percent by volume of magnetic particles will adhere to a strong magnet with enough force to remain thereon even when the magnet is lifted clear of the water. The preferred content of 0.5–3.0 percent by volume allows for lesser magnetic fields, or for magnetically counteracting wind and wave motion effect or simply for more effective control of the oil slick.

Although the practice of the present invention does not involve use of any specific magnetic equipment to collect or control the magnetized slick, some systems contemplated for collection can be described briefly for further understanding of the present invention. Thus for example, one approach to typical harbor or ocean spills involves spraying the ferrofluid thereon, and then after a short period of time, e.g., 1 hour, collecting magnetically. One or more rotating magnets (electromagnet or permanent magnet) is mounted between the hulls of a catamaran or other twin-hulled vessel. As the boat advances through the slick each rotating magnet picks up magnetized oil off the water surface and carries the oil around on the magnet. A doctor blade or other wiping mechanism wipes the oil from the surface of the rotating magnet and passes the oil to a collecting chamber. The doctor blade leaves a cleaned magnetic surface for renewed contact with oil still in the water. With such magnetic arrangements for lifting the oil slick little water need be taken up. Only the slick is attracted to the magnet.

A different approach, one particularly adapted to major spills, is to add ferrofluid only at the periphery of the spill then employ magnetic booms to contain the slick, while other collection or disposal techniques are employed to remove the oil in the spill. It may be emphasized now that the addition of ferrofluid is most advantageous, in the sense that all material added to the oil slick is removed with the oil slick. Even if the oil of the slick is burned, on the water or after recovery, the ferrofluid burns too leaving behind only magnetic particles as part of the ash and not much of that either, i.e., less than about 3.0 percent by volume, whatever had been added to the slick.

Any ferrofluid left in the water does not constitute a serious pollutant. The carrier is volatile enough to evaporate in time. Biodegradable surfactants e.g., oleic acid can be employed. The magnetic particles are the only true residue and these will form an almost insignificant (nontoxic) inorganic addition to the silt on the ocean, lake or river bottom.

For further understanding of this invention the following specific examples are herein below presented.

EXAMPLE 1

A series of ferrofluids suitable for treating oil slicks were formed by ball milling finely divided magnetite, carrier liquid and stabilizing agent (surfactant). Details of the individual ferrofluids are tabulated below.

With all the ferrofluids described in table 1, the drop did not spread on distilled water, passing the spreading test, and indicating thereby the presence of very little free surface active material in solution. Essentially all of the surfactant added to stabilize the colloidal suspension is adsorbed on the surface of the magnetite particles and not free to interact at the oil/water interface. Ferrofluid 1,109 (ex. 1-6) contains 11 percent oleic acid by volume, equivalent to a concentration of 0.35 moles/liter of solution, yet passing the spreading test indicates a concentration of free oleic acid less than 0.01 moles/liter, and probably far less.

To demonstrate that the proportion of carrier may be varied greatly, without affecting ferrofluid stability, ferrofluids 1,102 and 1,103 were obtained from ferrofluid 1,101 by vacuum distillation removal of carrier liquid.

In another instance, a ferrofluid originally formulated with a substantial excess of surfactant was adjusted down in spreading coefficient to the 20 dynes/cm. level by contacting the ferrofluid with activated charcoal. (This ferrofluid later became ferrofluid 1,109).

TABLE I

| | Overall composition—volume | | | Principal physical properties | | | |
|---|---|---|---|---|---|---|---|
| | | | | | Kinematic | Magnetic properties | |
| Run | Magnetite size | Stabilizing agent | Carrier liquid | Density, gm./cm.$^3$ (25° C.) | viscosity CS, 30° C. | Initial Susceptibility | Saturation magnetization, gauss |
| 1-1a | 88 A | PIBSA | Kerosene | .844 | 4.1 | 0.10 | 43 |
| 1102 | 1.4% | 5.3% | 93% | | | | |
| 1-1b | 88 A | PIBSA | Kerosene | .878 | 6.0 | 0.19 | 80 |
| 1103 | 2.6% | 9.9% | 87% | | | | |
| 1-1c | 88 A | PIBSA | Kerosene | 1.01 | 53 | 0.40 | 172 |
| 1104 | 5.7% | 27.1% | 73% | | | | |
| 1-2 | 6.7% | PIBSA | Methyl cyclohexane | 1.096 | 54 | 0.47 | 195 |
| 1105 | 84 A | 17.1% | 75% | | | | |
| 1-3 | 5.0% | PIBSA | Decahydronaphthalene | 1.068 | 32 | 0.35 | 150 |
| 1106 | 84 A | 12.8% | 82% | | | | |
| 1-4 | 4.6% | PIBSA | Tetradecane | 0.962 | 32 | 0.32 | 138 |
| 1107 | 84 A | 11.7% | 84% | | | | |
| 1-5 | 85 A | PIBA | Kerosene | 0.915 | 6.8 | 0.18 | 80 |
| 1108 | 3.0% | 7.5% | 90% | | | | |
| 1-6 | 80 A | Oleic acid | Tetradecane | 0.965 | 3.6 | 0.17 | 131 |
| 1109 | 4.8% | 11.0% | 84% | | | | |
| 1-7 | 70 A | Dodecyl amine | Decahydronaphthalene | 0.897 | 5.6 | .03 | 28 |
| 1110 | 1.1% | 2.0% | 97% | | | | |
| 1-8 | 84 A | PIBSA | Kerosene | 0.972 | 5.1 | 0.24 | 100 |
| 1111 | 3.4% | 8.6% | 88% | | | | |

TABLE II.—PROPERTIES OF STABILIZING AGENTS USED TO PREPARE TEST FERROFLUIDS

| | Oleic acid (purified) | Polyisobutene acid (PIBA) | Polyisobutene succinic acid (PIBSA) | Dodecyl amine (D.A.) |
|---|---|---|---|---|
| Source | Fisher Scientific Co. | Enjay Chemical Co. | Enjay Chemical Co. | Fisher Scientific Co. |
| Molecular weight | 282 | 1,000 peak | 1,000 peak | 185. |
| Acid Number (ASTM D-664) (where applicable) | 198 | 30-45 | 105-20 | N.A. |

TABLE III.—DESCRIPTION AND PROPERTIES OF CARRIER LIQUIDS USED TO PREPARE TEST FERROFLUIDS

| | Refined kerosene | n-Tetradecane | Methyl cyclohexane | Decahydronaphthalene |
|---|---|---|---|---|
| Source | Humble Oil & Refining. | Eastman Kodak | Fisher Scientific Co. | Fisher Scientific Co. |
| Category | Mixed paraffins | Paraffin | Monocyclic branched naphthene. | Bicyclic naphthene. |
| Density (25° C.) grams/cm.$^3$ | 0.786 | 0.759 | 0.765 | 0.877. |
| Viscosity (30° C.) CS | 1.9 | 2.3 | 1.1 | 2.1. |
| Boiling point, ° C. | 205-254 | 254 | 100° C | 187-195. |
| Spreading coefficient (of sample on distilled water at room temperature). | S<0 | S<0 | S<0 | S<0. |

The above ferrofluids were, of course formulated so that all exhibited a spreading coefficient less than 20 dynes/cm. against distilled water at room temperature. However determination of whether a candidate ferrofluid meets this criterion can be done by the relatively simple pass-fail test outlined below.

An aliquot of ferrofluid is dissolved in a non-spreading oil of known negative spreading coefficient using a dilution ratio which depends on the coefficient of the oil ($20/S_o$ where $S_o$ is the spreading coefficient of the oil). In tests on the above ferrofluids one volume of ferrofluid was diluted with 12.5 volumes of mixed cis and trans decahydronaphthalene (Fisher Scientific Co.) which measured a spreading coefficient of 1.4 dynes/cm. against distilled water [by ASTM method D-1331 (1965)].

A drop of the mixture is placed on water surface in a glass vessel that was carefully cleaned in chromic acid and rinsed with distilled water. If the drop does not spread, the original ferrofluid has a sufficiently low spreading coefficient for the present purposes. If this drop spreads, the spreading coefficient of the ferrofluid is in excess of 20 dynes/cm. and the ferrofluid is not considered suitable for practice of the present invention.

EXAMPLE II

Ferrofluids available from other ferrofluid work were tested by the above described spreading coefficient test to determine suitability. None passed. These ferrofluids are described in table IV.

TABLE IV.—FERROFLUIDS NOT APPLICABLE

|  | Examples— | | |
| --- | --- | --- | --- |
|  | 2-1 (1112) | 2-2 (1088) | 2-3 (1059) |
| Magnetite: | | | |
| Size, A | 88 | 87 | 80. |
| Concentration [1] | 12.2 | 3.6 | 2.0. |
| Stabilizing agent | PBISA | Tenlo 70 | Oleic acid. |
| Concentration [1] | 46.5 | 8.7 | 7.0. |
| Carrier | Kerosene | Kerosene | Kerosene. |
| Concentration [1] | 40 | 88 | 91. |
| Density, gm./cm.$^3$ (25° C.) | 1.27 | 0.894 | 0.875. |
| Kinematic viscosity (30° C., cs) | 6,800 | 2.5 | 1.7. |
| Initial susceptibility | 0.78 | 0.27 | 0.07. |
| Saturation magnetization, gauss | 368 | 108 | 55. |
| Spreading coefficient against distilled water | ([2]) | ([3]) | ([3]). |
| Average particle diameter, angstroms | 88 | 87 | 80. |

[1] Volume percent.
[2] Passes test.
[3] Does not pass test.

Ferrofluid 1,059 differs from ferrofluid 1,109 principally in the concentration of free oleic acid. Percolation of ferrofluid 1,059 through a column filled with activated charcoal granules removed virtually all of the free oleic acid and the ferrofluid was then employed to prepare 1,109.

Ferrofluid 1,088 shows the surfactant must be firmly attached to the magnetic particle surfaces, reversible adsorption is not desirable. The surfactant used in this instance, Tenol-70 is described by the manufacturer (Diamond Shamrock Corp.) as an oil soluble nonionic, the condensation product of an amino ester of a fatty acid. With this surfactant (and a kerosene carrier) a substantial free surfactant content has been required to maintain a stable dispersion of colloidal magnetite.

Aside from failing the spreading coefficient test, ferrofluid 1,088 exhibited a related disability. Specifically, substantial dilution induced flocculation of the magnetite particles. In terms of oil slick treatment considerable dilution of the ferrofluid (in the oil slick) is contemplated and the ferrofluid should be dilutable to almost any degree without flocculating.

Ferrofluid 1,112 is included to demonstrate that the particle content can be increased to what is an essentially nonusable level as a practical matter without destroying colloid stability or upsetting the spreading coefficient test. Ferrofluid 1,112 was prepared by vacuum evaporation of the carrier liquid from ferrofluid 1,102.

EXAMPLE III

This example shows that practice of the invention is limited to ferrofluids i.e., stable colloidal dispersions of magnetic particles, of an extremely small size range distribution i.e., less than about 300 A.

A commercial grade of magnetite powder (MO 4,332 — Minerals Pigments and Metals Division of Charles Pfizer & Co.) was dispersed in a solution of oleic acid and decahydronaphthalene in the following volume fraction proportions.

| Magnetite | 0.030 |
| --- | --- |
| Oleic Acid | 0.004 |
| Decahydronaphthalene | 0.966 |

The specific area of the magnetite particles is 12.5 m.$^2$/g. a much lower value than the 75 m.$^2$/g., of particles present in ferrofluids. The above oleic acid concentration corresponds to about a monolayer of oleic acid on the particle surfaces.

A 50 cc. sample of the above mixture in a test tube shaken for 1 hour at 280 cycles/min. in a reciprocating shaker then an aliquot of the (black) suspension was removed from the tube and one drop placed on a distilled water surface (in a Petri dish). The drop did not spread. Additional suspension to a total of about 0.5 cc. was added. The suspension formed a floating black lenticular drop with the magnetite remaining in the oil phase. Thereafter a hand magnet (gap field 2,000 oe) was brought close to the suspension which caused agglomeration of the magnetite and attraction to the magnet, leaving behind a clean lens of oil floating on the water. Only a small fraction of the oil was removed with the magnetic particles by the magnet.

EXAMPLE IV

This example shows that essentially all of a ferrofluid can be removed from a wide range of aqueous substrates.

A series of tests were run each with a tared 14 cm. diameter Petri dish filled with water and weighed on a balance sensitive to 0.1 g. to ascertain the weight of water. A small quantity of ferrofluid was dropped on the water surface and its weight determined. After about 2 minutes the diameter of the ferrofluid slick was estimated, allowing also the thickness of the slick to be estimated.

Thereafter a C-shaped hand magnet-gap field 4,300 oe, gap volume 1.5 cm.$^3$ (gap width 0.76 cm., length 0.63 cm., depth 3.1 cm.) was brought down close to the surface of the slick, which attracted the ferrofluid slick and caused its removal from the water. The change in gross weight of the Petri dish was then determined.

The ferrofluids tested were ferrofluids 1,102, 1,104, 1,105, and 1,108. The aqueous substrates employed were distilled water, Lowell (Mass.) tap water, and standard buffer solutions pH 6, pH 7, pH 8, of 0.05 molar solutions monosodium phosphate and sodium hydroxide (Fisher Scientific Co.). Sea water was unavailable at the time these tests were run (but was employed for the tests described in example 6).

In all tests essentially all of the ferrofluid was removed by bringing the magnet just above the liquid surface, even through the ferrofluid slick was quite thin (1 mm. and as little as 0.1 mm.). The quantity of material removed by the magnet exceeded the weight of ferrofluid added, due to inclusion of some water with the ferrofluid taken up by the magnet. Removal of ferrofluid was almost complete. Left behind in all instances, was only a transparent brownish film (more or less discontinuous). The thickness of the residual film was estimated as not more than a few microns.

All told the behavior of the ferrofluid, magnetic pickup of the ferrofluid and of the micron thickness; unrecoverable residue did not differ materially with any of the aqueous substrates not with the different ferrofluids.

EXAMPLE V

This example shows that very dilute ferrofluids can be controlled by application of magnetic forces and that ferrofluids can be diluted to a very great extent without affecting colloid stability.

The equipment employed included a 14 cm. Petri dish and an electromagnet with a 1.5-inch gap. The magnetic field along the horizontal line bisecting the gap was known as a function of the applied current and distance from the center of the magnet. The Petri dish was filled with water (distilled) and placed next to the pole pieces of the magnet so that the water level was in the same horizontal plane as the center of the magnet.

In consequence, a drop of ferrofluid placed on the water surface along the center line bisecting the gap would be subjected to a uniaxial magnetic force (of known magnitude) tending to pull the drop toward the magnet.

The actual magnetic force $F_m$ acting on a drop at a distance $X_1$ from the magnet is:

$$F_m = \nu \int_{H_1}^{H_2} M dH$$

where $\nu$ is the drop volume.

TABLE V. HORIZONTAL MOTION OF A DILUTE FERROFLUID AS A FUNCTION OF APPLIED FIELD

| Ferrofluid [1] | Magnetite concentration volume, fractions | Ferrofluid saturation magnetization, gauss | Applied current, amps | Initial distance of drop from center of magnet-X | Magnetic field H at X, oersted | Horizontal magnetic field gradient, oe./cm. | Fluid magnetization M in a field H, gauss | Magnetic forces on drop dynes | 0.025 cm.³ drop moves toward magnet |
|---|---|---|---|---|---|---|---|---|---|
| 1102-A | 6.4×10⁻⁴ | 1.84 | 7.5 | 7.75 | 116 | 19 | 0.40 | 1.5×10⁻² | No. |
| | 6.4×10⁻⁴ | 1.84 | 4.0 | 7.00 | 80 | 26 | 0.30 | 1.5×10⁻² | No. |
| | 6.4×10⁻⁴ | 1.84 | 2.5 | 5.50 | 92 | 16 | 0.35 | 1.1×10⁻² | No. |
| | 6.4×10⁻⁴ | 1.84 | 5.0 | 5.50 | 185 | 32 | 0.55 | 3.5×10⁻¹ | Yes. |
| | 6.4×10⁻⁴ | 1.84 | 1.0 | 3.25 | 140 | 78 | 0.51 | 8.0×10⁻¹ | Yes. |
| 1102-B | 7.2×10⁻⁵ | 0.21 | 30.0 | 7.75 | 430 | 57 | 0.92 | 1.1×10⁻² | No. |
| 1102-C | 1.4×10⁻⁶ | 4.1×10⁻² | 50.0 | 7.75 | 550 | 75 | 0.021 | 3.2×10⁻³ | No. |
| | 1.4×10⁻⁶ | 4.1×10⁻² | 50.0 | 4.00 | 2,900 | 790 | 0.033 | 5.2×10⁻¹ | Yes. |

[1] Ferrofluid 1102 diluted with tetradecane.
NOTE:
Volume concentration magnetite in Ferrofluid 1102=0.015.
Saturation magnetization Ferrofluid 1102=43 gauss.

By systematically diluting an aliquot of ferrofluid 1,102 with tetradecane, ferrofluids of decreasing magnetic concentration were obtained. The magnetite concentrations and magnetic properties were calculated from the dilution ratios. For this series of tests a drop volume of 0.025 ml. was employed, and each drop formed a lens on the water surface with a diameter (D) of about 0.5 cm. The experimental results are summarized in table V below.

The below tabulated results demonstrate that extremely dilute ferrofluids are magnetically attracted. Ferrofluid 1,102 C is 10⁴ times more dilute than the parent ferrofluid 1,102.

A significant finding was that even the most dilute ferrofluids were stable. The drops move toward the magnet in a manner consistent with uniform dispersion therein of the magnetite and with no visual evidence of particle segregation or agglomeration.
where:
$H_1$ = Field at $x + D/2$
$H_2$ = Field at $x - D/2$
$M$ = Fluid magnetization at a field H As a first approximation (where $X_1 = X$) the above equation is equal to $$F_m = \nu \left( M \frac{dH}{dX} \right)$$

By keeping the drop volume constant (0.025 ml. during these tests) the magnetic force on a drop of given ferrofluid becomes solely a function of the local field, and that in turn is an already known function of the current applied to this electromagnet and the distance of the drop center from the magnet.

Since the resistance to initial motion would be due principally to adhesion of the drop to water (interfacial forces) and to inertial forces, test results on diluted ferrofluids would show first whether the drop is still a ferrofluid (i.e., uniformly magnetic). Any substantial particle segregation in the drop of fluid would affect the behavior of the drop. In addition this test shows the extent of dilution possible before magnetic susceptibility decreases to the point of no magnetic response.

A second set of tests were run with the same equipment. In each test a drop of oil (nonmagnetic) was placed 7¾ inches from the magnet, and the magnet drew 50 amps. At this point the magnetic-field ($H$) was 550 oe while the local horizontal field gradient was 75 oe/cm.

In the first test a 0.025 ml. drop of tetradecane was placed on the water. It did not move. Then an equal sized drop of ferrofluid 1,102 A was added to the sessile drop of tetradecane. The large drop of combined liquid immediately moved as whole toward the magnet.

In a second like test about 0.5 ml. of No. 6 oil was carefully placed on the surface of a water sample (which previously had been in contact with the oil). The sample did not spread, forming instead a sensile drop about 1.5 cm. in diameter. The magnetic field had no effect on this drop (nor had it any affect on the tetradecane). A 0.025 ml. drop of ferrofluid 1,102 was added to the No. 6 fuel oil drop. The combined drop immediately started moving as a body toward the magnet.

EXAMPLE VI

This example shows the effect of ferrofluids and magnetic forces on small scale simulated oil spills of No. 2 fuel oil SAE 30 lubricating oil and No. 6 fuel oil.

The equipment employed was the same as in example IV, namely a water filled tared 14 cm. Petri dish mounted on a balance sensitive to 0.1 g. After the weight of water was determined the oil was added to the surface at first drop by drop to determine, qualitatively the spreading characteristics of the oil, then more rapidly until the entire surface of the water was covered with oil. The weight of added oil was then determined. Thereafter the ferrofluid was added to the oil and allowed to diffuse therein for about 10 minutes, aided by intermittent gentle blowing on the surface to create oil circulation. With the lighter fuel oil and lube oil, complete dispersion of the ferrofluid could be determined visually. The extent of mixing could not be so determined with the black opaque No. 6 fuel oil.

After the mixing time delay, the C-shaped hand magnet used in example IV was brought down to the oil surface. Oil literally jumped out of the water whenever the magnet came within about 2 cm. of the liquid surface. Oil was drawn to the magnet until the gap was filled with oil. The magnet was then removed, the oil wiped off the magnet, and the operation repeated until no additional oil could be removed. The Petri dish was weighed after each pass of the magnet to determine the quantity of material removed.

In the instance of the No. 2 fuel oil (Run 6-1) and the lubricating oil (Run 6-2) essentially complete removal of oil from the water surface was effected, with most of the oil remaining adhered to the sides of the Petri dish. Only a thin iridescent, almost transparent film of oil remained on the water surface; estimated thickness is a few microns. The number of passes (of the magnet) needed to remove the oil seemed to depend on the gap volume. Except for the last few passes which are directed to the residual oil film and to the material adhering to the side wall of the Petri dish, the gap of the magnet was always filled with oil.

The test results are summarized in table VI.

adhered to the side of the test tank and part was a transparent film on the water about 25 microns thick.

For a second test a 68 cm. ring was placed in the center of

TABLE VI.—REMOVAL OF DIFFERENT OILS FROM AQUEOUS SURFACES

| Example | 6-1 | 6-2 | 6-3A | 6-3B |
|---|---|---|---|---|
| Aqueous substrate | Lowell tap water | Winthrop beach sea water. | 10% NACl solution. | 10% NACl solution. |
| Density, gm./cm.³ | 1.0 | 1.025 | 1.075 | 1.075. |
| Type of oils | No. 2 fuel oil | Lub. oil, SAE 30 non-detergent. | No. 6 fuel oil | No. 6 fuel oil. |
| Source | Speedway Gas Co., Lowell, Mass. | Getty Oil Co | Metropolitan Fuel. Boston, Mass. | Residual from Test 6-3A. |
| Viscosity (30° C.) cp | 2.5 | 150 | 2,000 | |
| Density | 0.850 | 0.880 | 0.965 | |
| Color | Deep yellow | Light yellow | Black | |
| Oil added, gm | 20.5 | 21.8 | 20.7 | 13.4. |
| Slick thickness, cm | 0.16 | 0.17 | 0.14 | 0.009. |
| Ferrofluid | No. 1108 | No. 1109 | No. 1106 | No. 1106. |
| Ferrofluid weight, gm | 4.0 | 4.3 | 7.4 | 4.8. |
| Saturation magnetization of oil slick, gauss | 10 | 20 | 40 | 40. |
| Total material added, gm | 24.5 | 26.1 | 28.1 | 18.2. |
| Total material removed, gm | 24.6 | 26.6 | 14.7 | 18.0. |
| Number of magnet passes | 14 | 10 | 7 | 6. |
| Surface after test | Slightly oily brownish tinge. | Yellowish tinge | Black oil slick | Thin transparent film. |
| Estimated removal of oil (ferrofluid free basis)¹, percent. | 99 | 99 | 36.7 | 98. |

¹ Calculated average.

As indicated in the results tabulated above the material removed in runs 6-1 and 6-2 weighed more than the original charge of oil and ferrofluid due to a small carry over of water, less than 1 percent in run 6-1 and 2 percent in run 6-2.

In the instance of the viscous No. 6 fuel oil (Run 6-3A) the same mixing procedure did not result in complete dispersion of the ferrofluid. Repeated passes of the magnet removed only a fraction of the oil even though sufficient ferrofluid had been added to give the oil-ferrofluid mixture a higher average saturation magnetization (40 gauss) than the slicks of runs 6-1 and 6-2. More material was removed by the first pass than all subsequent passes, and the material seemed much less viscous than the oil removed in subsequent passes. After 7 passes additional ferrofluid was added and the slick stirred with a thin rod for a few minutes to promote mixing. The test was then continued as run 6-3B, with essentially complete removal of the oil from the water surface.

In the above described tests (Runs 6-1, 6-2, 6-3) the oil layers were thin, all less than 2 mm. thick. Oil slicks of this thinness are very difficult to remove by nonmagnetic techniques.

EXAMPLE VII

A series of simulated oil spill recovery tests were carried out in a 145 cm. diameter test tank filled with Lowell tap water.

The magnetic field source was a water cooled 48 turn ¼-inch copper tubing coil. The coil was 6 in. O.D., 2 inches I.D., 3 inches long. A current of 400 Amps at 11 volts DC generated a field of 1,400 oe. The coil was placed horizontally in the water with its axis at the water line. A ¼-inch polyethylene suction tube was mounted at about the center of the coil with its inlet just above the water level to draw off any oil magnetically drawn into the coil.

In the first run 556 g. of No. 6 fuel oil and 50 g. of ferrofluid 1,111 were thoroughly admixed then the mixture was carefully poured on the water surface in the 145 cm. tank forming a slick 15 in. in Diameter, about 0.5 cm. thick. The closest edge of this slick was about 1 foot from the throat of the coil (which was near the edge of the pool). At first, after the current was turned on the coil seemed to have no noticable effect on the slick. However, once the edge drifted or was drawn to within about 5 inches of the coil, the oil was sucked quickly and continuously into the coil. Within about 20 seconds the slick had collected in the immediate vicinity of the coil.

Thereafter the vacuum pump was turned on and the oil drawn through the suction tube into a receptacle. A total of 682 g. was collected, including essentially all of the magnetized oil together with about 20 percent water. Part of the water pickup was accidental. Of the oil not recovered part was the 145 cm. tank to form an annular flow channel about 45 cm. wide, and the water therein was pumped around the channel at a surface velocity of 5 cm./sec. (0.1 knot/hr.) The same electromagnet coil was placed in the center of the channel with its throat in the direction of flow. The suction tube was again disposed centrally of the coil near the water line.

Then 228 g. of No. 6 oil was added to the water, forming a discontinuous elongated slick less than 0.5 cm. thick in the moving water. The electromagnet which was activated momentarily for this purpose had no effect on the slick. About 1 minute after the oil was added 55 grams of ferrofluid 1,111 was added to the oil and 3 minutes (about 2.5 revolutions of the slick) was allowed for mixing. Then the coil was energized and 6 minutes later suction drawoff turned on and remained on for 11 minutes drawing the oil into a tared receiver. A total of 336 g. of oily material was removed. The material analyzed as a water in oil emulsion — 68 wt. percent oil phase 32 wt. percent water.

Recovery was not complete, being only about 82 percent of the oil and ferrofluid, 78 percent of the oil alone. Visual observation indicated that the remaining oil was magnetically unresponsive, indicating that mixing of oil and ferrofluid had been incomplete, suggesting that allowing a several hour mixing period may be desirable for large scale oil spill recovery of multiple ferrofluid additions and passes or both expedients.

In the present test a second pass through the recovery system was made. A further addition of 5 grams more ferrofluid to the remaining oil slick was made, and the two allowed to mix for 35 minutes, then the electromagnet and suction turned on for 9 minutes. By then the oil was a thin layer about 0.05 cm. thick but was still attracted to the magnet and removed by the suction, carrying however a much higher water content. A total of 52 grams of oil phase and 345 grams of free decantable water was removed to the receiver.

Assuming the same water in oil emulsion of 32 percent water content this means that 35 g. of oil and ferrofluid was recovered for a total oil and ferrofluid recovery of 264 g. of the 283 g. added or about 92 percent. However much of the unrecovered oil was adhered to the sides of the channel, some in the interstices of the magnetic coil. Only a thin film (discontinuous) of oily material was floating on the water surface in the test tank. This film was captured by filtering through a tared absorbent paper towel which removed all visible traces of oil. Only 0.85 grams of oil was recovered in this fashion, indicating that the oil film had been about $7\times10^{-4}$ cm., showing that about 97 percent of the oil freely floating on the channel surface has been removed therefrom by the two passes.

What is claimed is:

1. A method of controlling a petroleum oil spill which comprises adding thereto a ferrofluid as hereinafter defined in quantities adequate to provide from 0.01–4.0 percent by volume of magnetizable particles in the mixture of oil and ferrofluid and thereafter applying magnetic forces to control the oil spill, said ferrofluid comprising a stable colloidal dispersion of magnetic particles of a size less than about 300 A., in a carrier hydrocarbon oil selected from the group consisting of $C_{9-21}$ aliphatic hydrocarbons and the saturated $C_{7-18}$ naphthenic hydrocarbons and mixtures thereof, stabilized by a water insoluble, hydrocarbon soluble surfactant and present in such concentration that the ferrofluid as a whole has a spreading coefficient less than about 20 dynes/cm., measured at ambient and with distilled water.

2. A method as in claim 1 wherein the surfactant does not increase the spreading coefficient of the hydrocarbon carrier oil by more than $10^5$ dynes/cm. per mole/liter solution of the surfactant.

3. A method as in claim 1 wherein the ferrofluid is added in quantities sufficient to provide from 0.5–3.0 percent by volume of magnetizable particles in the mixture of ferrofluid and oil.

4. A method as in claim 1 wherein the ferrofluid is sprayed over the surface of the oil spill.

5. A method as in claim 1 wherein the ferrofluid has a density just less than the water on which the oil spill floats.

6. A method as in claim 1 wherein the surfactant is an oil soluble, water insoluble carboxylic acid having at least 12 carbon atoms.

7. A method as in claim 6 wherein the surfactant is oleic acid.

8. A method as in claim 6 wherein the surfactant is a high molecular weight polyisobutene carboxylic acid.

9. A method as in claim 1 wherein oil from the spill is lifted clear of the spill by magnetic forces then recovered.

10. A method as in claim 9 whereby magnetic forces are used in conjunction with nonmagnetic oil removal.

* * * * *

UNITED STATES PATENT OFFICE
CERTIFICATE OF CORRECTION

Patent No. __3,635,819__ Dated __January 18, 1972__

Inventor(s) __Robert Kaiser__

It is certified that error appears in the above-identified patent and that said Letters Patent are hereby corrected as shown below:

Column 6, line 60, for "$\bar{V}_M M_1 H$", read ---$\bar{V}_M M_d H$---; Column 6, line 64, for "M ", read---$M_d$---; Column 6, line 65, for "EM", read---$E_M$---; Column 6, line 71, for "3X", read ---3x---; Column 6, line 71, for "$\bar{V}M$", read---$\bar{V}m$---; Column 6, line 75, for "M= $_m M_d$", read---M= $_M M_d$---; Column 7, line 4, for "$\bar{V}_m$", read---$\bar{V}_M$---; Column 7, line 9, please insert "(" before "M"; Column 8, line 9, delete "dynes/cm$^3$" and substitute therefor---those---; Column 11, line 38, for "Lerosene", read ---Kerosene---; Column 11, line 54, for "Tenol", read---Tenlo---; Column 12, line 66, for "not", read---nor---; Column 14, line 12, for "sensile", read---sessile---; Column 15, in the table, after "Saturation magnetization of oil slick, gauss", please insert---*---; Column 16, line 48, for "of", read---or---.

Signed and sealed this 20th day of February 1973.

(SEAL)
Attest:

EDWARD M. FLETCHER, JR.
Attesting Officer

ROBERT GOTTSCHALK
Commissioner of Patents